FIG_1

May 16, 1967 L. VADAS ETAL 3,319,398
APPARATUS FOR SEALING CARTONS
Filed June 17, 1964 9 Sheets-Sheet 6

INVENTORS
LESLIE VADAS
ROBERT W. DRAKE
BY Hans G. Hoffmeister
ATTORNEY

FIG_12

FIG_13

FIG_14

FIG_15

United States Patent Office 3,319,398
Patented May 16, 1967

3,319,398
APPARATUS FOR SEALING CARTONS
Leslie Vadas, Los Gatos, and Robert W. Drake, San Jose, Calif., assignors to FMC Corporation, a corporation of Delaware
Filed June 17, 1964, Ser. No. 375,895
12 Claims. (Cl. 53—375)

The present invention pertains to carton forming and filling machines and more particularly relates to apparatus for folding and applying sealing pressure to headed thermoplastic flaps to provide fluid-tight enclosures for cartons.

In carton forming and filling machines of the type disclosed in the application for patent of Heffelfinger et al., Ser. No. 216,248, filed Aug. 10, 1962, which issued on May 3, 1966, as Patent No. 3,248,841, and in the application for patent of Reimers et al., Ser. No. 293,350, filed July 8, 1963, and which issued on Oct. 25, 1966, as Patent No. 3,280,535, which applications are assigned to the assignee of the present invention, cartons are formed for use in packaging milk or similar products. The cartons have a wall structure which includes a cardboard inner base layer laminated with a polyethylene coating on both the outside and the inside of the base layer.

Although the laminated material from which the carton walls and closure parts are formed is intended to be of a predetermined thickness, and although the cartons are intended to be of a predetermined height, in actual practice the thickness and height of the cartons vary to such an extent that it is difficult to consistently obtain good closures when using top sealing apparatus that is presently available.

The cooperating parts of said known top sealing apparatus are operated by several power cylinders, each of which must be independently controlled relative to the others so as to regulate the rate of movement and the pressure applied to the associated parts of the sealing apparatus. It has been found that, because of the use of several independent power units, the maintaining of accurate control of the movement of these parts is difficult.

It is therefore, one object of the present invention to provide a carton sealing apparatus having a single power unit for operating its several parts.

Another object is to provide a top sealing apparatus for applying a predetermined sealing force to all carton flaps even when the flaps vary in thickness from a predetermined standard.

Another object is to provide a top sealing apparatus arranged to consistently provide good seals on cartons regardless of minor variations in the heights of the cartons.

Another object is to provide a top sealing apparatus having all component parts which act on the top closure suspended from above the cartons.

Another object is to provide a multiple faced cam for controlling the movement of all components of a top sealing apparatus upon predetermined angular movement of the cam.

These and other objects and advantages of the present invention will become apparent from the following description and the accompanying drawings, in which:

FIGURE 4 is an enlarged vertical section taken along lines 4—4 of FIGURE 2 showing the mechanism for supporting and operating the pressure resisting anvils of the top sealing apparatus, certain parts being removed and other parts being shown in phantom.

FIGURE 5 is a perspective of the pressure resisting mechanism of FIGURE 4.

FIGURE 8 is an enlarged transverse end elevation of the multiple faced cam shown operatively connected to still another component of the top sealing apparatus, certain parts being cut away and other parts being shown in section or in phantom.

The top sealing apparatus 20 (FIGS. 1 and 2) of the present invention is intended for use in a carton forming and filling machine of the type disclosed in the previously referred to Heffelfinger et al. application in place of the sealing apparatus disclosed therein. In the Heffelfinger et al. machine, two rows of cartons formed from a thermoplastic laminate are intermittently advanced past several stations where they are successively erected, filled with milk or similar products to be packaged, and heated so that the temperature of the thermoplastic material on the mating surfaces of the top closure are raised to a predetermined bonding temperature prior to their arrival at the closing station. When they are at the closing station, the different flaps and tabs of the top closure are deflected into a closed position and are held in this position under considerable force until the surfaces are bonded together thereby forming a fluid-tight closure. Reference may be had to said Heffelfinger et al. application for a detailed description of any part of the carton forming and filling machine that is not described in detail herein.

Figure 1:
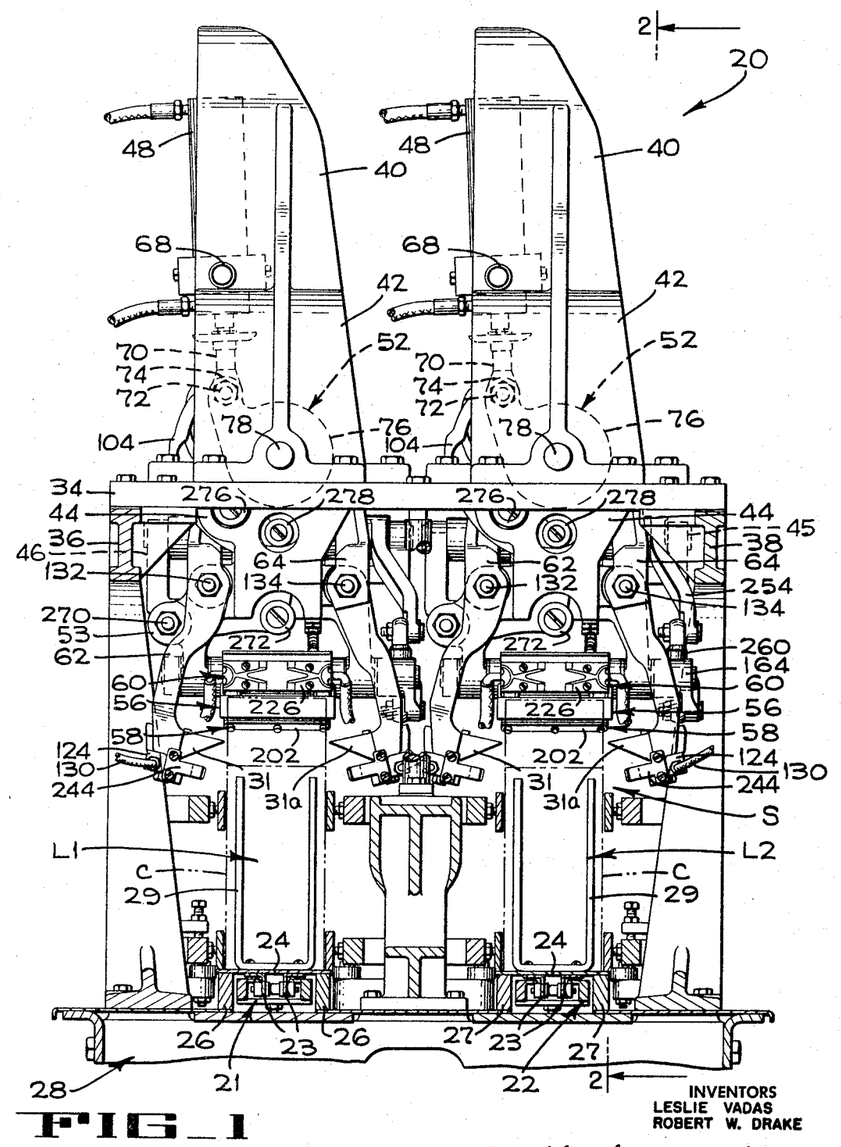
FIGURE 1 is a transverse section taken through a two lane carton forming and filling apparatus showing the top sealing apparatus of the present invention, certain parts being broken away and other parts being shown in sections.
Figure 2:
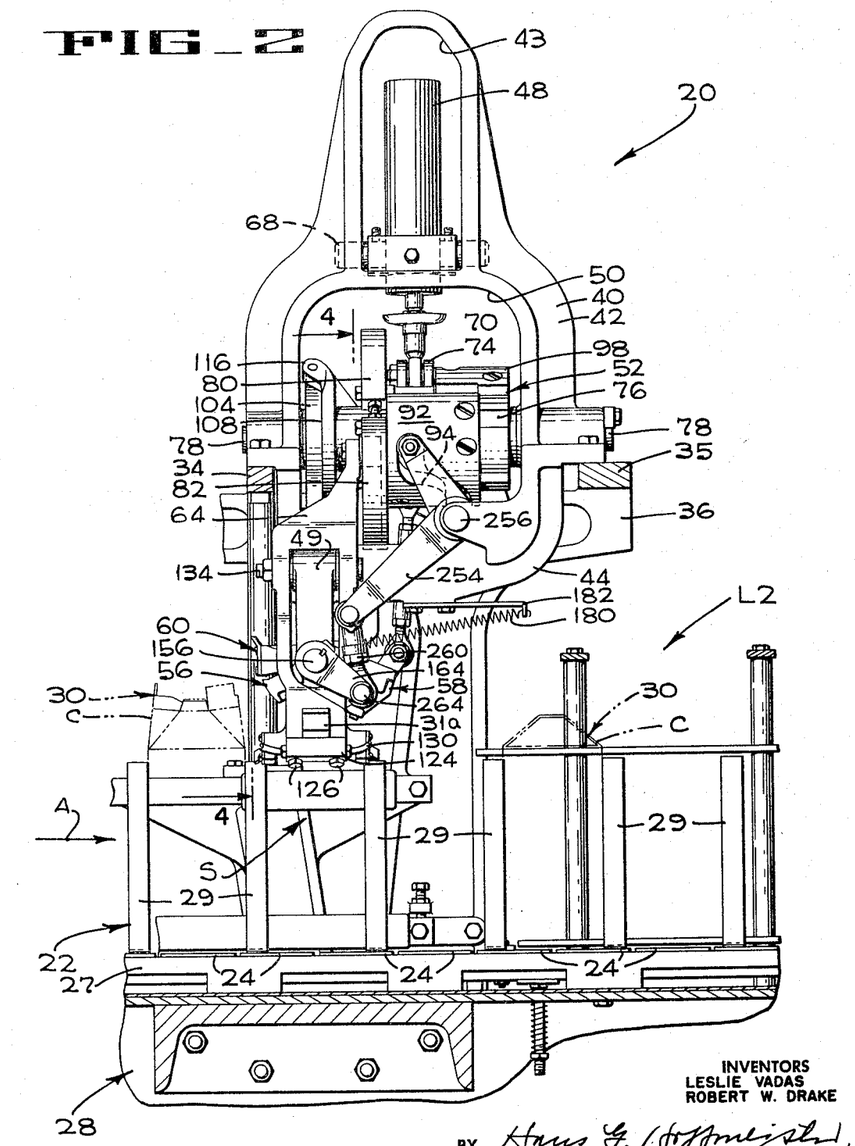
FIGURE 2 is a side elevation of the top sealing apparatus, the view being taken looking in the direction of arrows 2—2 of FIG. 1, with certain frame structure being broken away.

As illustrated in FIGURES 1 and 2, the top sealing apparatus 20 of the present invention is adapted to handle two lines L1 and L2 of containers C which are intermittently advanced into the carton closing station S by endless conveyors 21 and 22, respectively. The conveyors 21 and 22 are intermittently driven in the direction of the arrow A in FIGURE 2 so as to index each carton, in turn, in lines L1 and L2 into the sealing station S.

Each conveyor 21 and 22 includes a plurality of links 23 (FIG. 1) to which are secured flat horizontal carton-supporting plates 24 which are guided along rails 26 and 27 by side rollers 25. The rails 26 and 27 are secured to the frame 28 of the machine at a predetermined elevation so that the exact elevation of the plates 24 and the bottom of the cartons is accurately established. Spaced and upstanding U-shaped pusher bars 29 are secured to the plates 24 and serve to accurately position the cartons in spaced relation longitudinally of the conveyors. The conveyors are intermittently indexed at three second intervals, by means fully disclosed in the aforementioned application, in such a way that the cartons require six-tenths of a second to move between adjacent stations and are held stationary at the top sealing station S for approximately two and four-tenths seconds.

Since the portion of the top sealing apparatus 20 associated with lines L1 and L2 are identical, the parts in each line will be assigned the same numerals, and a description of the parts operating on one carton in one of the lines will serve to disclose the construction and operation of the parts of the other line. It will be understood, that the top sealing apparatus 20 of the present invention operates on two cartons at the same time, one carton in each line. The apparatus 20 first gently folds the several heated flaps, tabs and lips of each of the top closures 30 of a carton together, as progressively shown in FIGURES 9, 10 and 11, and thereafter applies pressure to these folded parts so as to seal them in liquid-tight engagement against the resistance of anvils 31 and 31a (FIG. 4) inserted below a portion of the heated parts of the closure.

The top sealing apparatus 20 (FIGS. 1 and 2) is supported in an elevated position at station S on two spaced bridge plates 34 and 35 that are bolted to the upper ends of upper pedestals 36 and 38 which, in turn are bolted to the frame of the machine. The top sealing apparatus 20 includes a support frame 40 having an upper portion 42 projecting above the bridge plates 34 and 35 and a lower portion 44 projecting below the bridge plates. The upper portion 42 has an upper arched opening 43 (FIG. 2) for accommodating a hydraulic power unit 48 and a lower arched opening 50 for accommodating a multiple face cam 52.

Figure 16:
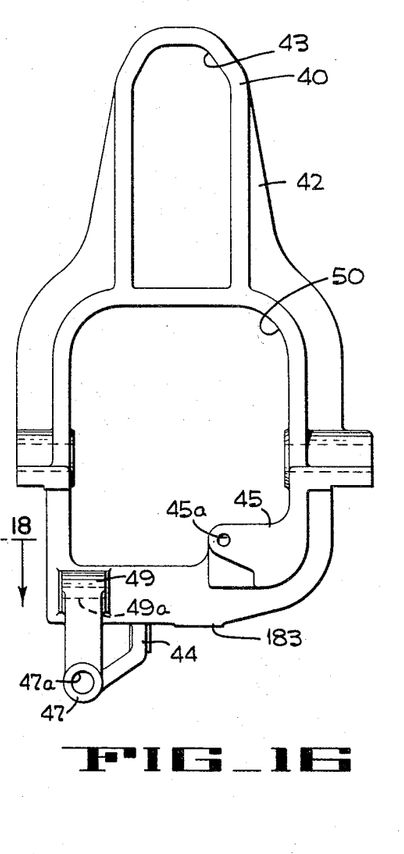
FIGURE 16 is a transverse elevation of a frame which supports the top sealing apparatus.
Figure 17:
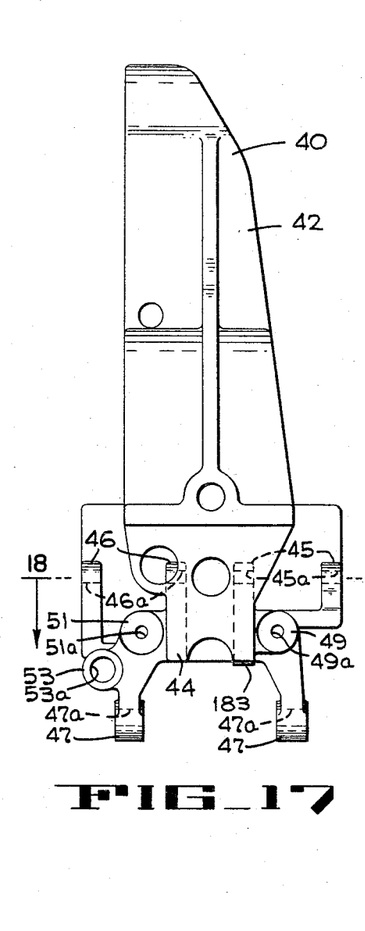
FIGURE 17 is a side elevation of the frame of FIGURE 16.
Figure 18:
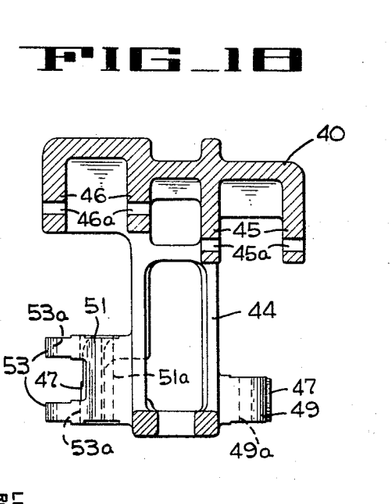
FIGURE 18 is a horizontal section taken along lines 18—18 of FIGURE 17.

The lower portion 44 of the frame 40 is particularly shown in FIGS. 16–18 and includes a pair of short wall members 45 providing aligned opening 45a; a pair of spaced wall members 46 providing aligned openings 46a; a pair of arms 47 providing aligned openings 47a; a boss 49 having an opening 49a; a boss 51 having an opening 51a; and a pair of arms 53 providing aligned openings 53a. The lower arched opening 50 is defined by the arms 47.

An important feature of the invention is the arrangement whereby all components of the sealing head 20 are operated by the single multiple faced cam 52 which is operated by the single hydraulic power unit 48. With this arrangement, timing problems between the different components of the top sealing apparatus are eliminated, and pressure and speed requirements can easily be controlled by regulating the pressure and rate of flow of the hydraulic fluid directed into the power unit 48.

As indicated in FIGURES 1 and 2, the lower end of the power unit 48 is secured to a pin 68 which is pivotally mounted in the upper portion 42 of the supporting frame 40. The piston rod 70 of the power unit 48 is pivotally connected by a bolt 72 to a yoke 74 (FIG. 3) defined by a pair of apertured tabs 75 secured, as by welding, to a generally cylindrical body 76 (FIGS. 3, 6 and 7) of the multiple faced cam 52.

Figure 3:
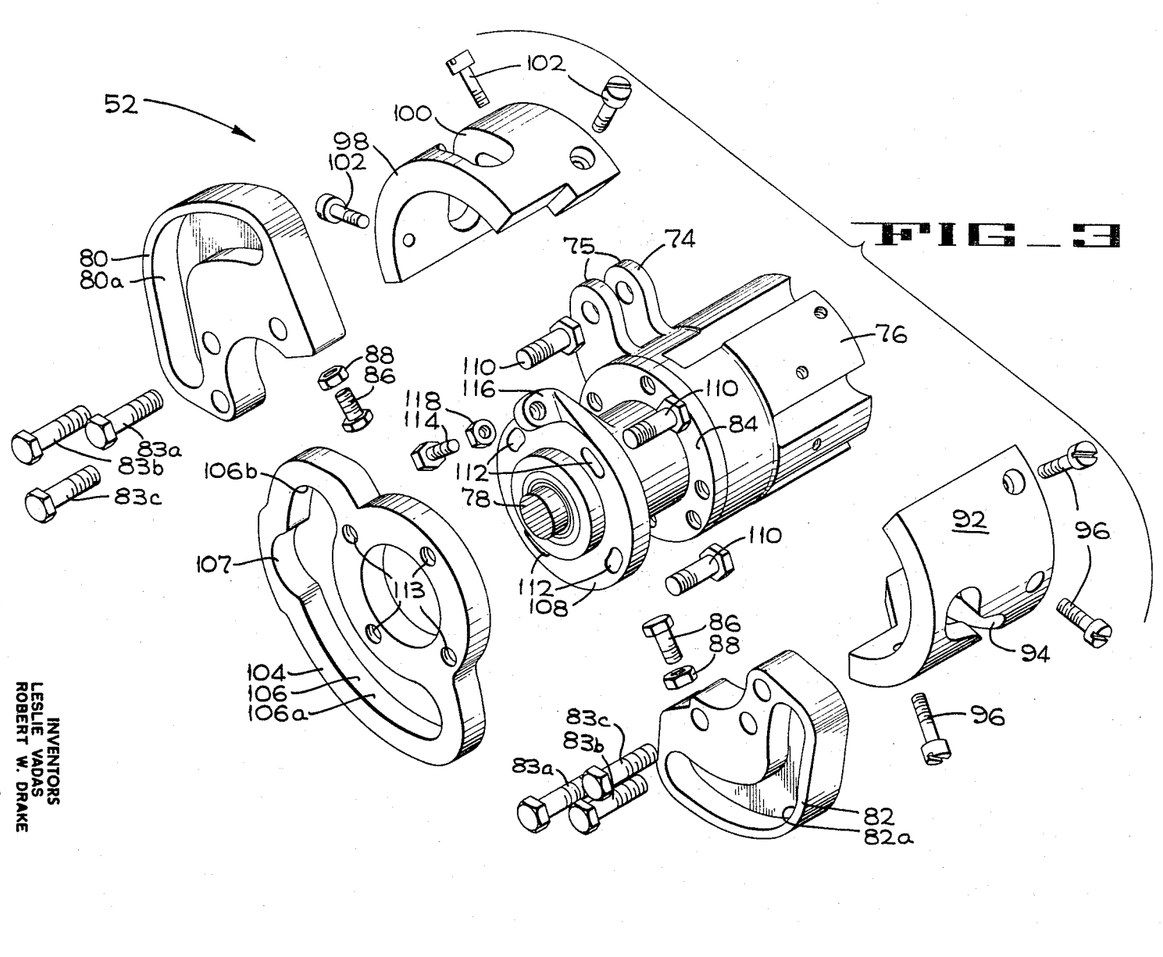
FIGURE 3 is an enlarged exploded perspective of a multiple faced cam which controls all moving parts of the top sealing apparatus of FIG. 1.

The cam body 76 is rotatably journaled on a shaft 78 which is secured to the upper portion 42 of the support frame as illustrated in FIGURES 1 and 2 so as to position the cam 52 within the opening 50 of the frame 40. As indicated in FIGURES 3, 4 and 5, the cam 52 includes a pair of cam plates 80 and 82 having cam grooves 80a and 82a formed therein. The cam plates 80 and 82 are connected by cap screws 83a, 83b and 83c to an annular surface 84 of the cam. Provision for minor angular adjustments of the cam plates 80 and 82 relative to the cylindrical body 76 is made by making the holes in plates 80 and 82, through which cap screws 83a and 83b project, slightly oversize so that the plates can be shifted about cap screws 83c by adjustment bolts 86. As seen in FIG. 4, each bolt 86 is threaded into one plate and has its head bearing against the other plate. After the adjustments have been made, the bolts 86 are locked in position by lock nuts 88 and the cap screws are tightened to rigidly secure the plates 80 and 82 to the cam body 76. It is to be understood that after these initial adjustments have been made that no further adjustments should be needed for the life of the machine.

Figure 7:
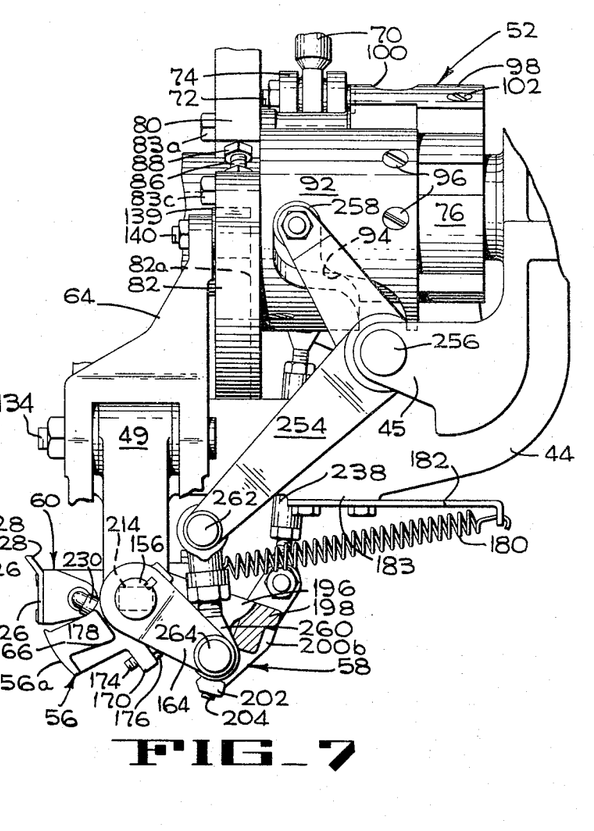
FIGURE 7 is an enlarged elevation of the right side of the multiple faced cam shown operatively connected to other components of the sealing apparatus, certain parts of the top sealing apparatus being removed.
Figure 11:
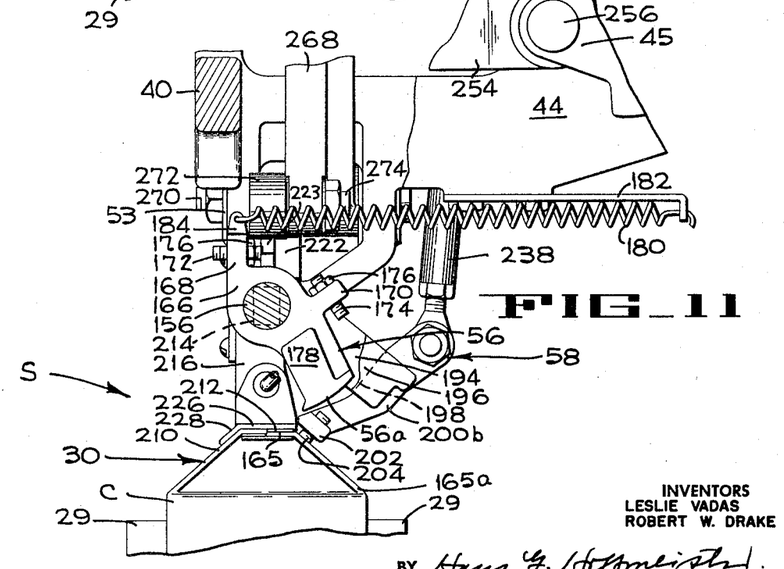

The multiple faced cam 52 also includes a cylindrical cam segment 92 which is provided to shift the folding shoe 56 and sealing bar 60 between the position shown in FIGURES 7 and 11. The cylindrical cam segment 92 has an S-shaped cam groove 94 formed in its periphery, and the segment 92 is rigidly secured to the cam body 76 by cam screws 96.

A cylindrical cam segment 98 (FIGS. 3 and 6) has an S-shaped groove 100 therein and is rigidly secured to the opposite side of the cylindrical body 76 from the segment 92 by cap screws 102. The cam segment 98 is provided to operate the front support 58 as will be described in more detail hereinafter.

The multiple faced cam 52 also includes a pressure applying cam plate 104 (FIGS. 3 and 8) for applying sealing pressure to the sealing bar 60. The cam plate 104 includes an arcuate cam groove 106 having a roller receiving notch 107 in one of its surfaces. The plate 104 is rigidly connected to an annular flange 108 (FIG. 3) of the cam body 76 by cap screws 110 which extend through slots 112 in the disc 108 and which are screwed into threaded holes 113 in the cam plate 104. Exact angular adjustment of the plate is obtained by an adjustment screw 114 which has its head abutting a flattened surface of plate 104 and is threaded into an opening in an ear 116 projecting outwardly from the flange 108, screw 114 being locked in place by a locknut 118. It will be appreciated that, after initial adjustments have been made, the plate 104 is rigidly locked to the flange 108 by the cap screws 110 and by the adjustment screw 114, and that no other adjustment should be required for the life of the machine.

An important feature of the invention is to support the anvils 31 and 31a, as well as the other operating components of the machine, above the path of movement of the cartons so that no physical adjustments need be made between the anvils and the other components of the apparatus even though the height of cartons being sealed may vary slightly from each other.

As clearly illustrated in FIGS. 4 and 5, the anvils 31 and 31a are rigidly secured to the lower ends of the arms 62 and 64, respectively, by clamp blocks 124. The clamp blocks 124 are each secured to the lower end of the associated arm by cap screws 126 thereby rigidly clamping the anvils 31 and 31a within a slot 128 formed in each arm. In order to dissipate heat from the anvils 31 and 31a, the blocks are provided with internal cooling passages (not shown) through which cooling water is circulated by flexible tubes 130.

The arm 62 is slotted and is mounted for pivotal movement by a bolt 132 which extends through the opening 51a (FIGS. 17 and 18) in the lower frame portion 44. Similarly, the arm 64 is slotted to receive the boss 49 of the lower frame portion 44 and is mounted for pivotal movement on the frame portion by a bolt 134 which extends through the opening 49a. A cam follower 136 is journalled on a shouldered bolt 128 which is secured to the upper end of the arm 62 and rides within the cam groove 80a. Similarly, a cam follower 139 is journalled on a shouldered bolt 140, which is secured to the upper end of the arm 64, and rides in cam groove 82a. Thus, movement of the multiple faced cam 52 through an 80° arcuate range of travel in a counterclockwise direction (FIG. 4) will move the anvils 31 and 31a from the solid line position spaced outwardly from the carton C to the phantom line position, with flap supporting surfaces 142 of the anvils 31 and 31a disposed within indented portions of the top closure and in supporting relation with certain flaps and tabs of the top closure.

In order to accurately position the top closure 30 of the carton in the top-sealing station S, guide shoes 114 (FIG. 5) having outwardly flaring end portions 146 are bolted to ears 148 which are formed integrally with and project outwardly from both sides of the lower ends of each arm 62 and 64. The shoes 144 on each arm are spaced from each other a distance slightly greater than the width of the carton so as to accurately engage and center the carton at station S longitudinally of the direction of movement of the carton. Squaring blocks 150 are formed on the inside surface of the arms 62 and 64 adjacent each shoe 144 so as to engage the adjacent walls of the carton and center the carton transversely of the associated conveyor when the anvils 31 and 31a are moved to the flap supporting phantom lined positon shown in FIGURE 4. Squaring pins 152 are provided on the flap engaging surface of each anvil and engage the outer edges of certain flaps and tabs to square the same relative to the body of the carton being sealed.

Figure 6:
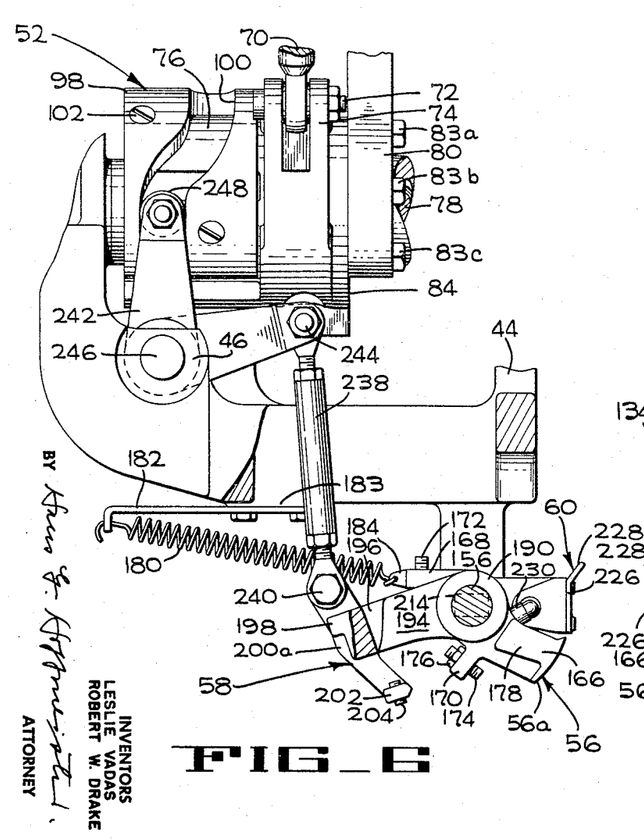
FIGURE 6 is an enlarged elevation of the left side of the multiple faced cam of FIG. 3 shown operatively connected to one of the operating components of the top sealing apparatus, certain parts of the sealing apparatus being removed.

It will be understood that the folding shoe 56 (FIGS. 6 and 7, the front support shoe 58, and the sealing bar 60 are substantially identical to those disclosed in the aforementioned Heffelfinger et al. and Reimers et al. applications and operate in substantially the same manner. Accordingly, the specific details of these carton engaging units form no part of the present invention, the novelty of the present invention being in the appartus for actuating these units. However, in order to give a better understanding of the operation of the top sealing apparatus, these carton engaging units will briefly be described hereinafter.

The folding shoe 56 (FIGS. 6, 7 and 8), in front support shoe 58, and sealing bar 60 are all mounted on a shaft 156 which is journalled in the arms 47 (FIG. 17) of the lower frame portion 44. The shaft 156 extends transversely of the conveyor 21 and 22 through openings 47a and is positioned at station S above a carton C at the station. A collar 162 (FIG. 8) and the hub of a lever 164 are set screwed to opposite ends of the shaft and abut the arms 47 so as to prevent axial movement of the shaft.

Figure 9:
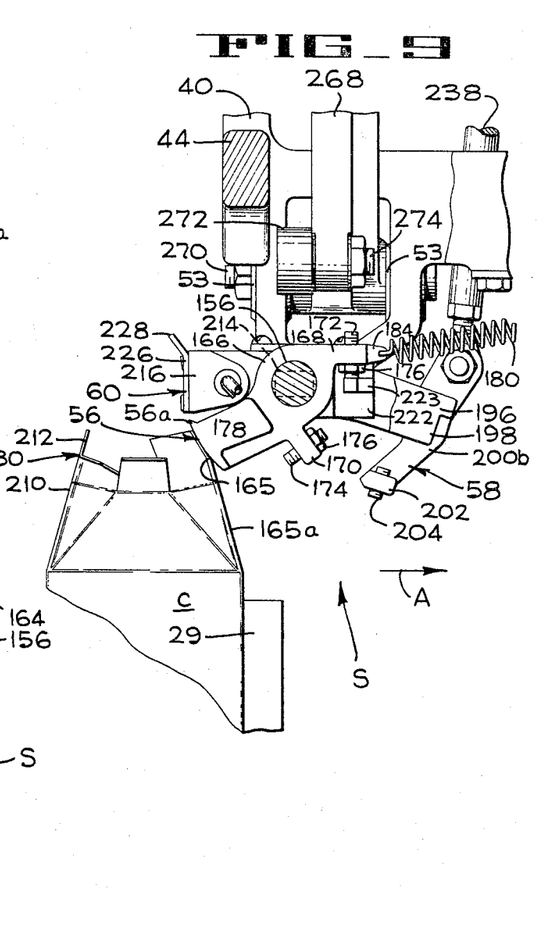
FIGURES 9, 10 and 11 are operational views illustrating progressive positions of certain components of the top sealing apparatus relative to a carton, the pressure resisting anvils being omitted for clarity of illustration.
Figure 10:
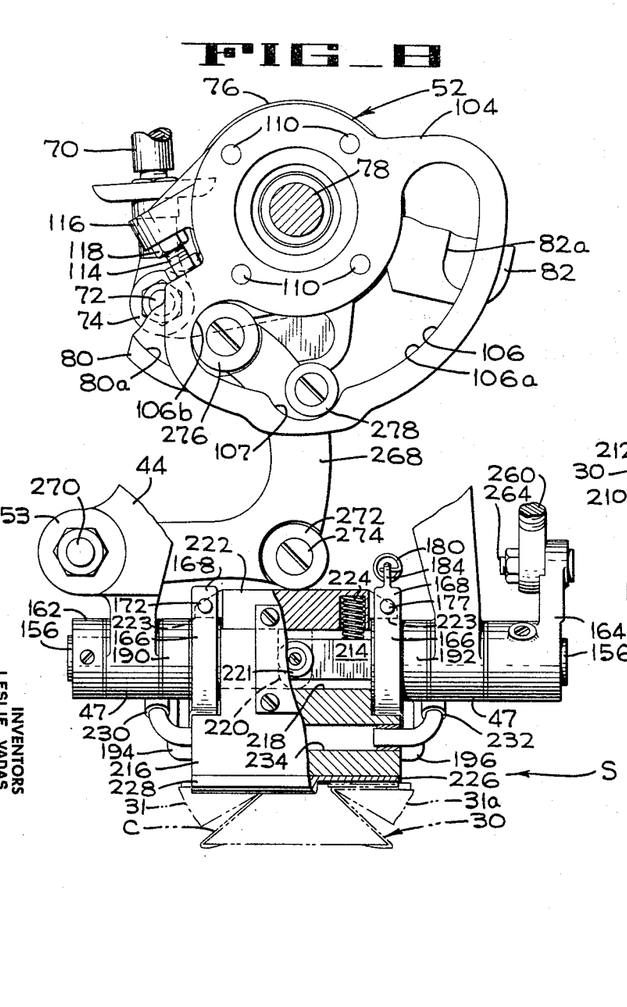

The folding shoe 56 (FIGS. 9, 10, and 11) is provided to engage a narrow lip 165 on the front flap 165a of the carton as the carton is moved into the sealing station S and to progressively fold the flap downwardly as indicated in FIGS. 9–11.

The folding shoe 56 comprises a pair of arms 166 (FIG. 8) each of which is journalled on the shaft 156 and includes a pair of tabs 168 and 170 (FIG. 9) with set screws 172 and 174 screwed therein and locked in adjusted position by lock nuts 176. Each arm 166 has a projection 178 extending downwardly therefrom, and a transversely extending folding shoe bar 56a (FIG. 1) is secured across the lower ends of the projections 178. As best shown in FIGURES 10 and 11, a spring 180 is connected between a bracket 182, that is bolted to a longitudinally extending web 183 (FIG. 16), the frame portion 44, and an apertured extension 184 formed on one of the ears 168. The spring 180 normally urges the folding shoe 56 to pivot in a counterclockwise direction as viewed in FIGURES 9–10.

The front support shoe 58 (FIGS. 6, 8 and 9) is provided for the purpose of engaging and holding the front flap 165a of the top closure 30 in an inclined position after the carton has been indexed into the sealing position at Station S shown in FIG. 10. The front support shoe 58 comprises a pair of collars 190 and 192 (FIG. 8) collar 190 having an arm 194 (FIG. 6) connected thereto and collars 192 having an arm 196 (FIG. 7). A cross-bar 198 is formed integral with arms 194 and 196 and is disposed between the arms. Two arms 200a and 200b (FIGS. 6 and 7 respectively) project outwardly from the cross-bar 198, and a bar 202 which carries three self-locking set screws 204 (FIG. 1) is rigidly connected to the arms 200a and 200b. As seen in FIG. 10, the set screws 204 may be adjusted as desired to accurately position the front flap 165a when the carton is in the sealing station S.

The sealing bar 60 (FIGS. 8–11) is provided in order to fold the rear flap 210 and a wide lip 212 on the upper end of the flap 210 into sealing position as progressively illustrated in FIGURES 10 and 11, and to thereafter move downwardly to apply a sealing force to top closure parts that are disposed between the sealing bar 60 and the anvils 31 and 31a to seal the top closure.

The sealing bar 60 (FIGS. 8 and 9) is mounted on a central rectangular portion 214 of the shaft 156 so as to rotate with the shaft 156 and also move a short distance vertically relative thereto when disposed in the position shown in FIGURE 8. The sealing bar 60 comprises a main body 216 having a transversely extending, vertically opening rectangular slot 218 formed in its upper end for the purpose of slidably accommodating the rectangular portion 214 of the shaft 156. A vertical slot 220 is provided in one of the walls which defines the slot 218 and is arranged to receive a roller 221 that is rotatably connected to the shaft 214 and aids in guiding the sealing bar 60 for vertical movement relative to the shaft. A closure plate 222 having ears 223 projecting outward from both sides, is connected to the body 216, as by bolting, and closes the upper end of the slot 218. A pair of compression springs 224 (only one being shown in FIG. 8) are disposed between the head 222 and the rectangular portion 214 of the shaft 156 and normally urges the sealing bar upwardly relative to the shaft. A sealing shoe 226, having an embossed surface to provide for a better seal, is bolted to the lower end of the body 216 and includes an inclined flange 228 which aids in the folding and squaring of the rear flap 210.

In order to cool the sealing bar 60, cooling water is directed through hoses 230 and 232 (FIG. 8) which are connected to a cooling passage 234 formed in the body 216.

In order to actuate the folding shoe 56, the front support shoe 58, the sealing bar 60 and the anvils 31 and 31a, and to apply sealing pressure to the sealing bar 60, these units are operatively connected to the multiple faced cam 52 by suitable linkages.

As shown in FIGURE 6, the front support shoe 58 is pivotally connected to one end of an adjustable link 238 by a bolt 240, the other end of the link 238 being pivotally connected to one end of a bell crank 242 by a bolt 244. The bell crank 242 is pivoted on a shaft 246 that is secured in the opening 46a (FIG. 17) in the wall members 46 of the lower portion 44 of the support frame 40. The other end of the bell crank 242 has a cam follower 248 journalled thereon, which cam follower rides in the S-shaped cam groove 100 of the multiple faced cam 52. It will be appreciated that downward movement of the piston rod 70 will cause the bell crank 242 to pivot clockwise (FIG. 6). As a result shoe 58 is pivoted counterclockwise to shift it from its inactive position shown in FIGURE 6 to its active position shown in FIGURES 10 and 11.

The sealing bar 60 is pivoted, in response to movement of the cam 52, from its inactive position shown in FIGURE 7 to its active position shown in FIGURE 11 by a bell crank 254 (FIG. 7) that is pivoted on a shaft 256 secured in openings 45a in the short wall members 45 of the frame portion 44. The bell crank 254 has a cam follower 258, which rides in the S-shaped groove 94, journalled on one end. At its other end the bell crank is pivotally connected to an adjustable link 260 which, in turn, is pivotally connected to the free end of the aforementioned lever 164 by a bolt 264.

It will be appreciated that the movement of the folding shoe 56 is controlled by the multiple faced cam 52 but in an indirect manner. As shown in FIGURE 9, the spring 180 normally holds the shoe 56 in the path of movement of the carton, the exact position of the shoe being limited by the engagement of set screws 172 with the ears 223 on the closure plate 222 of the sealing head. As the carton to be sealed moves into the sealing station S, it engages and pivots the shoe 56 to the position shown in FIG. 10 wherein the set screws 174 engage other surfaces of the ears 223 to terminate movement of the shoe 56, causing the narrow lip 165 of the carton to be folded to the position shown in FIG. 10. While the lip 165 is held in this position, the sealing bar 60 is moved to the vertical sealing position shown in FIG. 11 as a result of further angular movement of cam 52. As seen in FIG. 7, downward movement of piston rod 70 causes clockwise pivoting of bell crank 254 and counterclockwise pivoting of shaft 156 to move sealing bar 60 downwardly. Referring to FIG. 11, as the sealing bar 60 moves downwardly, the ears 223 move upwardly to engage the set screws 172 and pivot the shoe 56 counterclockwise away from the carton. Thus, the folding shoe 56 is mounted for a limited amount of pivotal movement relative to the sealing bar 60 but is indirectly actuated by the multiple faced cam 52 through the sealing bar 60.

After the sealing bar 60 has been moved to the vertical flap folding and sealing position shown in FIG. 11, continued movement of the multiple faced cam 52 to the end of its 80° arcuate range of travel in a counterclockwise direction (FIG. 8) to the position shown in FIGURE 8 causes sealing pressure to be applied to the sealing bar 60. This pressure is transmitted from the end 106b of the groove 106 in the cam plate 104 to the head 222 by a lever 268 (FIG. 8) which has one end pivotally connected to the pair of arms 53 (FIGS. 17 and 18) of the frame portion 44 by a bolt 270 which extends through the opening 53a. A cam follower 272 is journalled on a bolt 274 connected to the lever intermediate the ends thereof and is disposed in position to engage the closure plate 222. A cam follower 276 is journaled on the other end of the lever 268 and is disposed in the arcuate cam groove 106. A lever lifting roller 278 is also journaled on the lever 268 and serves to ride along the lower arcuate surface 106a of the cam to thereby hold the cam follower 272 above the head of the sealing bar 60 at all times except when it rides into notch 107 during the time the sealing bar is applying sealing pressure to the carton flaps. As clearly shown in FIG. 8 when the end 106b of the cam groove 106 is contacting the cam follower 276 and is applying the requisite sealing pressure, the lifting roller 278 is disposed in the notch 107.

Figure 12:
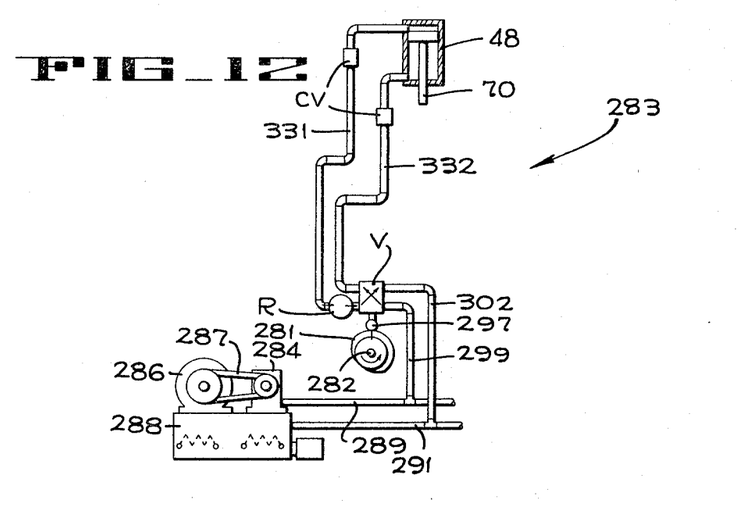
FIGURE 12 is a diagram illustrating the hydraulic system for the top sealing apparatus.

In order to actuate the single hydraulic power unit 48 (FIG. 12) in timed relation with the movement of the conveyors 21 and 22, a four-way timing control valve V is provided. The valve V is operated by a cam 281 keyed to a cam shaft 282 which is schematically shown in FIG. 12 and is driven one revolution for each intermittent movement of the conveyors 21 and 22. The drive for the conveyors 21 and 22, and for the cam shaft 282 is fully disclosed in the aforementioned Heffelfinger et al. application, and reference may be had to said application if a detailed description of these drive parts is desired.

The valve V and the hydraulic power unit 48 are included in the hydraulic power system 283 (FIG. 12) which includes a pump 284 driven by a motor 286 through a belt drive 287. The pump 284 draws hydraulic fluid from the sump 288 and delivers it at high pressure through a distribution manifold 289. After passing through the power unit 48, the hydraulic fluid is returned to the sump 288 through a return manifold 291.

As has already been mentioned, the direction of flow of the hydraulic fluid into the power unit 48 is controlled by the 4-way hydraulic valve V. The rate of movement of the piston rod 70 is controlled during both extension and retraction by two speed control valves CV, one valve being placed in each conduit connecting the power unit 48 to the manifolds 289 and 291 so as to permit free entry of hydraulic fluid into the power unit and to restrict to a predetermined rate the discharge of fluid therefrom.

Figure 13:
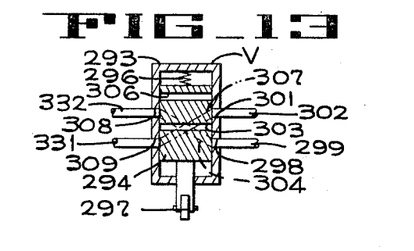
FIGURE 13 is an enlarged central section through a four-way hydraulic valve employed in the hydraulic system of FIGURE 12.

The 4-way valve V1 is shown diagrammatically in FIG. 13 and includes a housing 293 having a shiftable core 294 therein. A spring 296 disposed between the core and the housing normally urges a cam follower 297, journalled on one end of the core, against the cam 281. A high pressure conduit 299 is connected between a port 298 and the high pressure distribution manifold 289, and a port 301 is connected by a low pressure conduit 302 to the return manifold 291. The port 298 communicates either with a straight line passage 303 extending centrally through the core 294, or with a slanted or crossed passage 304 which extends along the periphery of the cylindrical core. Similarly, the port 301 communicates either with a straight passage 306 or with a slanted passage 307 that is formed in the periphery of the core 294 on the opposite side of the core from the peripheral passage 304. With this arrangement, hydraulic fluid can be selectively directed through the discharge ports 308 and 309 in the housing 293. It will be understood that each of the passages 303, 304, 306, and 307 are independent passages and do not communicate with each other.

Figure 14:
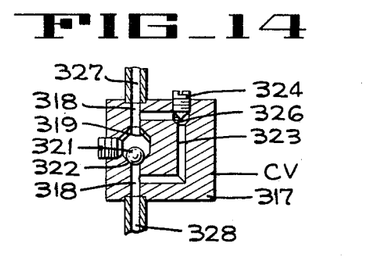
FIGURE 14 is an enlarged central section through one of several speed control valves in the hydraduilc systems of FIG. 12.

Each speed control valve CV (FIG. 14) comprises a housing 317 having a straight line passage 318 therethrough. An enlarged portion 319 of the passage 318 has a ball check valve 321 therein which rests against the seal 322 to prevent flow of fluid downwardly (FIG. 14) through the passage 318, but permits unrestricted flow upwardly (FIG. 14) through the passage 318. A U-shaped control passage 323 in the housing 317 bypasses the ball valve 321 and communicates with opposite ends of the straight line passage 318. An adjustable needle valve 324 cooperates with a frusto-conical seal 326 in the control passage to resist the downward (FIG. 14) flow of fluid therethrough, to thereby control the rate of travel of the piston rod 70 of the hydraulic power unit 48. It will be understood that the needle valve 324 will be adjusted so as to achieve the desired rate of travel of the piston rod 70 of the power unit 48. It will also be understood that the speed control valves CV are positioned so that the upper ports 327, rather than lower ports 328, are connected to the associated ends of the power unit 48.

As shown in FIGURE 12, a conduit 331 having one of the speed control valves CV and a relief valve R therein is connected between the upper end of the power unit 48 and the port 309 in the valve V, and a conduit 332 having a speed control valve CV therein is connected between the lower end of the power unit 48 and the port 308 in the valve V.

Figure 15:
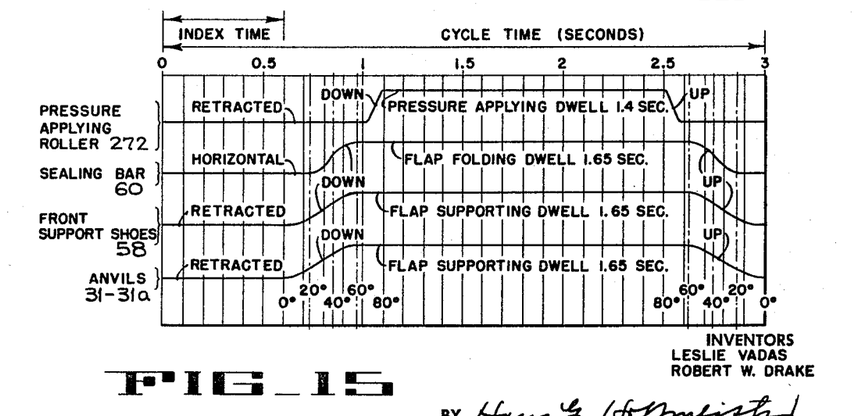
FIGURE 15 is a chart illustrating the timing of the several components of the top sealing apparatus.

The operation of the several components of the top sealing apparatus 20 (FIGS. 8–11) of the present invention will be given in relation to the timing chart shown in FIGURE 15. As indicated in FIGURE 15, each complete cycle of operation requires three seconds for sealing the top closure of a carton. The conveyor 21 or 22 requires 0.6 second of this three second cycle of operation to move a carton to be sealed into the sealing station, and the carton remains in the sealing station for 2.4 seconds. The chart of FIGURE 15 also indicates that the continuously rotating timing cam 281 (FIG. 12) shifts the valve V 0.6 second after the cycle begins so that hydraulic fluid flows to the upper end of the hydraulic power unit 48. The speed control valve CV in the conduit 332 is adjusted so that the piston rod 70 moves through its entire downward stroke in 0.5 second thereby causing the multiple faced cam 52 to rotate 80° in a counterclockwise direction to the position shown in FIGURE 8. The power unit then dwells in this position for 1.4 seconds before the valve V is returned to its original position by the cam 281, whereby the piston rod 70 is returned to its upper starting position to cause the cam 52 to rotate 80° in a clockwise direction and return to its original position shown in FIGURE 1. The speed control valve CV in conduit 331 is regulated to cause the piston rod 70 to return to its uppermost position in 0.5 second at which time the cycle of operation is completed.

As the carton being sealed is being moved by the associated conveyor 21 or 22 into the sealing station S, the narrow lip 165 of the top closure 30 engages the folding shoe 56 as shown in FIGURE 9 and is gently folded to the position shown in FIGURE 10 as the carton comes to rest in the sealing station S. During this interval the engagement between the carton and the folding shoe 56 causes the shoe to pivot relative to the sealing bar 60 to the position shown in FIGURE 10 against the urging of the spring 180.

The front support shoe 58 is cammed downwardly upon downward movement of the piston rod 70. It will be noted that the contour of the cam groove 100 (FIG. 6) which controls this front support shoe 58 is such that the shoe 58 begins to shift after the cam 52 has rotated about 5° and completes its movement after about 55° of rotation of the cam.

The anvils 31 and 31a (FIGS. 4 and 5) being to move inwardly almost immediately upon downward movement of the piston rod 70 and terminate their inward movement when the multiple faced cam 52 has rotated approximately 60°. Thus, during this 60° of movement of the cam 52, the anvils move from their retracted positions shown in solid lines in FIGURE 4 to the active flap-supporting, pressure-resisting positions shown in phantom lines in FIGURE 4. When in the flap supporting position, the guide shoes 144, squaring blocks 150, and squaring pins 152 accurately square the top closure of the carton.

The sealing bar 60 begins to move from the horizontal position of FIGURE 7 after the cam 52 has rotated approximately 20° and completes its movement to the vertical position of FIG. 11 after the cam has rotated approximately 60°. It will be appreciated that, as the sealing bar 60 approaches the position shown in FIGURE 11, the ears 223 will engage the set screws 172 and will shift the folding shoe 56 out of engagement with the carton.

After the sealing bar 60, front support shoe 58, and folding shoe 56 have been moved to the position shown in FIGURE 11 and after the anvils 31 and 31a have been moved under the flaps as indicated in phantom lines in FIGURE 4, continued movement of the cam 52 (FIG. 8) causes the end 106b of the cam groove 106 to engage the cam follower 276 and apply the requisite sealing pressure to the sealing bar 60. As shown in FIGURE 15, sealing pressure is applied after the cam 52 has rotated between approximately 70° and 80°. It will be understood that the pressure applied to the sealing bar 60, and resisted by the anvils 31 and 31a with the flaps disposed therebetween, will prevent further downward movement of the piston rod 70. It is important to note that this pressure can be easily controlled by adjusting the single relief valve R (FIG. 12) to provide the desired sealing pressure. It has been found that a sealing pressure of approximately 200 p.s.i. provide consistently good seals.

It is also important to note that while sealing pressure is being applied, there is no tendency for the anvils to move out of their flap supporting positions since they are positively locked in these positions by the cam grooves 80a and 82a.

As indicated in FIGURE 15, after the initial sealing pressure has been applied, this pressure is maintained during a dwell of 1.4 seconds thereby assuring that the heated thermoplastic material on the surfaces of the closure 30 which are to be sealed together will properly adhere to each other.

After 2.5 seconds of the cycle time has passed, the timing cam 281 returns the valve V to its original position causing hydraulic fluid to flow in a direction which will move the piston rod 70 upwardly and rotate the cam 52 through 80° in the opposite direction to its original position. The return of the several components to their upper starting position occurs in 0.5 second. Because the upward movement of the components is controlled by the same camming grooves which were used to move the components downwardly to their active positions, but which are rotating in opposite directions during the return movement of the component, the return movement of each component is symmetrical to the above-described downward movement. The cycle of operation is thereafter repeated for the next cartons to be sealed.

From the foregoing description it will be apparent that the top sealing apparatus of the present invention includes a multiple faced cam operated by a single hydraulic power unit for controlling the movement of the several cooperating components of the apparatus. The sealing pressure applied to the carton flaps may be easily adjusted by controlling the single pressure regulator R, and the rate of movement of all components of the apparatus can be controlled by the two speed control valves CV. The top sealing apparatus also features a support disposed above the path of movement of the cartons to provide a common support for all operating components of the apparatus, and camming surfaces which positively lock the anvils in pressure resisting position. This assures that there will be no relative movement between surfaces which are to be sealed together during the time pressure is being applied to these surfaces.

While one embodiment of the present invention has been shown and described, it will be understood that various changes and modifications may be made without departing from the spirit of the invention or the scope of the appended claims.

The invention having thus been described, what is believed to be new and desired to be protected by Letters Patent is:

1. A sealing apparatus for sealing the top closure of a thermoplastic carton having heated sealing surfaces, comprising means for folding the flaps of the top closure together with certain portions of the sealing surfaces projecting outwardly from the upper edges of certain of said flaps; pressure resisting means insertable below said projecting portions; means for applying a predetermined sealing force upon said projecting portions against the resistance of said pressure resisting means; and common power means for actuating said folding means, said pressure resisting means, and said sealing means in predetermined timed relation; said common power means including a single power unit and a movably mounted multiple faced cam having camming surfaces operatively connected to said folding means, said pressure resisting means, and said sealing means; said multiple faced cam being connected to said single power unit for movement thereby through a predetermined range.

2. A sealing apparatus for sealing the top closure of a thermoplastic carton having heated sealing surfaces, comprising means for folding the flaps of the top closure together with certain portions of the sealing surfaces projecting outwardly from the upper edges of certain of said flaps; pressure resisting means insertable below said projecting portions; means for applying a predetermined sealing force upon said projecting portions against the resistance of said pressure resisting means; common power means for actuating said folding means, said pressure resisting means, and said sealing means in predetermined timed relation; said common power means including a single hydraulic power unit and a movably mounted multiple faced cam having camming surfaces operatively connected to said folding means; said pressure resisting means, and said sealing means; said multiple faced cam being connected to said single hydraulic power unit for movement thereby through a predetermined range; and a single control means connected to said hydraulic power unit for regulating the rate of movement of said multiple faced cam in one direction.

3. A sealing apparatus for sealing the top closure of a thermoplastic carton having heated sealing surfaces, comprising means for folding the flaps of the top closure together with certain portions of the sealing surfaces projecting outwardly from the upper edges of certain of said flaps; pressure resisting means insertable below said projecting portions; means for applying a predetermined sealing force upon said projecting portions against the resistance of said pressure resisting means; common power means for actuating said folding means, said pressure resisting means, and said sealing means in timed relation; and means included in said common power means for positively locking said resisting means from movement during application of sealing pressure.

4. Sealing apparatus according to claim 3 wherein said locking means comprises a cam track operatively connected to said pressure resisting means for preventing movement of said pressure resisting means from below the projecting portions of the carton.

5. A sealing apparatus for sealing the top closure of a thermoplastic carton having heated sealing surfaces comprising means for folding the flaps of the top closure together with certain portions of the sealing surfaces projecting outwardly from the upper edges of certain of said flaps; pressure resisting means mounted for arcuate movement between a position spaced from the top closure to a position disposed below said projecting portions; means for applying a predetermined sealing force upon said projecting portions against the resistance of said pressure resisting means; and common power means for actuating said folding means, said pressure resisting means and said sealing means in predetermined timed relation.

6. A sealing apparatus for sealing the top closure of a thermoplastic carton having sealing surfaces, comprising means for folding the flaps of the top closure together with certain portions of the sealing surfaces projecting outwardly from the upper edges of certain of said flaps; pressure resisting means mounted for arcuate movement between a position spaced from the top closure to a position disposed below said projecting portions; means for applying a predetermined sealing force upon said projecting portions against the resistance of said pressure resisting means; common power means for actuating said folding means, said pressure resisting means, and said sealing means in predetermined timed relation; and single control means for regulating the rate of movement of said common power means in one direction.

7. A sealing apparatus for sealing the top closure of a thermoplastic carton having heated sealing surfaces, comprising means for folding the flaps of the top closure together with certain portions of the sealing surfaces projecting outwardly from the upper edges of certain of said flaps; pressure resisting means mounting for arcuate movement between a position spaced from the top closure to a position disposed below said projecting portions; means for applying a predetermined sealing force upon said projecting portions against the resistance of said pressure resisting means; common power means for actuating said folding means, said pressure resisting means, and said sealing means in predetermined timed relation; and means included in said common power means for positively locking said resisting means from movement during application of sealing pressure.

8. A sealing apparatus for sealing the top closure of a thermoplastic carton having heated sealing surfaces, comprising means for folding the flaps of the top closure together with certain portions of the sealing surfaces projecting outwardly from the upper edges of certain of said flaps; pressure resisting means mounted for arcuate movement between a position spaced from the top closure to a position disposed below said projecting portions; means for applying a predetermined sealing force upon said projecting portions against the resistance of said pressure resisting means; means carried by said pressure resisting means for engaging and squaring said top closure when said pressure resisting means is in said position disposed below said projection means; and common power means for actuating said folding means, said pressure resisting means, and said sealing means in predetermined timed relation.

9. A sealing apparatus for sealing the top closure of a thermoplastic carton having heated sealing surfaces, comprising means for folding the flaps of the top closure together with certain portions of the sealing surfaces projecting outwardly from the upper edges of certain of said flaps; pressure resisting means insertable below said projecting portions; means for applying a predetermined sealing force upon said projecting portions against the resistance of said pressure resisting means; common power means for actuating said folding means, said pressure resisting means, and said sealing means in predetermined timed relation; means included in said common power means for positively locking said resisting means from movement during application of sealing pressure; and means for cooling said pressure resisting means and said pressure applying means for dissipating heat therefrom.

10. A sealing apparatus for sealing the top closure of a thermoplastic carton having heated sealing surfaces, comprising means for folding the flaps of the top closure together with certain portions of the sealing surfaces projecting outwardly from the upper edges of certain of said flaps; pressure resisting means mounted for arcuate movement between a position spaced from the top closure to a position disposed below said projecting portions; means for applying a predetermined sealing force upon said projecting portions against the resistance of said pressure resisting means; common power means for actuating said folding means, said pressure resisting means, and said sealing mean in predetermined timed relation; and means for cooling said pressure resisting means and said pressure applying means for dissipating heat therefrom.

11. A top sealing apparatus for sealing the top closure of a thermoplastic carton having heated sealing surfaces, comprising means for folding the flaps of the top closure together with certain portions of the sealing surfaces projecting outwardly from the upper edges of certain of said flaps; pressure resisting means insertable below said projecting portions, means for applying a sealing force upon said projecting portions against the resistance of said pressure resisting means; common support means disposed above the top closure of the carton; said folding means, said pressure resisting means, and said sealing means being suspended from said common support means; a single power actuated cam movably mounted on said common support means above the top closure of the carton for actuating said folding means, said power resisting means, and said sealing means in predetermined timed relation; and independent linkage means operatively connecting said cam to said folding means, said power resisting means, and said sealing means.

12. A sealing apparatus for sealing the top closure of a thermoplastic carton having heated sealing surfaces, comprising a support frame disposed above the carton; a multiple faced cam journaled on said frame; a single power unit supported by said frame and pivotally connected to said cam to oscillate said cam from an inactive position to an active position; a folding shoe pivotally supported on said frame; a front support shoe pivotally supported on said frame and connected to a first camming surface of said cam; a sealing bar pivotally supported by said frame and connected to a second camming surface of said cam; said folding shoe, front support shoe, and sealing bar cooperating upon actuation of said cam from the inactive to the active position to fold the flaps of the top closure together with certain portions of the sealing surfaces projecting outwardly from the upper edges of certain of said flaps; a pair of arms pivotally mounted on said frame; an anvil mounted on the lower end of each arm; a pair of third camming surfaces of said cam operatively connected to said arms for moving said anvils between positions spaced from said top closure to positions insertable below said projecting portions upon movement of said cam to the active position; said third camming surfaces being adapted to positively lock said anvils below said projecting portions when said cam is in its active position; and a lever pivotally connected to said frame and operatively connected to a fourth camming surface of said cam, said lever being adapted to apply a predetermined sealing pressure upon said sealing bar when said projecting portions are disposed between said sealing bar and said anvils to terminate movement of said cam at said active position.

No references cited.

TRAVIS S. McGEHEE, *Primary Examiner.*